United States Patent
Chorney et al.

(10) Patent No.: US 6,681,791 B1
(45) Date of Patent: Jan. 27, 2004

(54) MANIFOLD VALVE POSITION INDICATOR AND OPERATOR ALERTING SYSTEM

(75) Inventors: Stephen Chorney, Laurys Station, PA (US); Richard Linton Samsal, Chandler, AZ (US); Stanley Louis Morton, Phoenix, AZ (US); Peter Joseph Kielhofner, Chandler, AZ (US); Todd Jeffrey Siegfried, Chandler, AZ (US); Thomas Anderson, Peoria, AZ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/256,158

(22) Filed: Sep. 26, 2002

(51) Int. Cl.⁷ .............................. F16K 37/00; F17D 3/00
(52) U.S. Cl. .................... 137/15.01; 137/266; 137/553; 137/555; 137/559
(58) Field of Search ................................ 137/559, 375, 137/255, 266, 15.01, 553, 555

(56) References Cited

U.S. PATENT DOCUMENTS

| | | | | |
|---|---|---|---|---|
| 1,358,862 A | * | 11/1920 | McArthur | 137/555 |
| 2,798,504 A | * | 7/1957 | Gast | 137/559 |
| 3,602,254 A | | 8/1971 | Fawkes | 137/554 |
| 3,682,196 A | | 8/1972 | Kosui et al. | 137/553 |
| 3,785,338 A | | 1/1974 | Visser | 116/125 |
| 3,878,862 A | | 4/1975 | Blanton | 137/553 |
| 3,896,280 A | | 7/1975 | Blake | 200/81.9 M |
| 3,910,308 A | | 10/1975 | Mack | 137/553 |
| 3,994,255 A | | 11/1976 | Thompson | 116/125 |
| 4,086,937 A | * | 5/1978 | Hechler, IV | 137/559 |
| 4,411,288 A | | 10/1983 | Gain, Jr. | 137/363 |
| 4,494,565 A | | 1/1985 | Sinclair et al. | 137/555 |
| 4,494,566 A | | 1/1985 | Sinclair et al. | 137/556 |
| 4,718,445 A | | 1/1988 | Lundberg et al. | 137/15 |
| 4,864,963 A | | 9/1989 | Schipper | 116/277 |
| 5,035,195 A | | 7/1991 | Wille | 116/277 |
| 5,137,052 A | | 8/1992 | Baumgart | 137/556 |
| 5,223,822 A | | 6/1993 | Stommes et al. | 340/686 |
| 5,469,805 A | | 11/1995 | Gibbs | 116/284 |
| 5,524,669 A | * | 6/1996 | Trueb et al. | 137/375 |
| 5,605,176 A | | 2/1997 | Herzberger | 137/556 |
| 5,647,396 A | | 7/1997 | Stommes et al. | 137/554 |
| 5,957,158 A | | 9/1999 | Volz et al. | 137/556 |
| 6,044,791 A | | 4/2000 | LaMarca et al. | 116/277 |
| 6,085,780 A | * | 7/2000 | Morris | 137/377 |
| 6,145,537 A | | 11/2000 | McCutcheon | 137/553 |

FOREIGN PATENT DOCUMENTS

| | | | | |
|---|---|---|---|---|
| GB | 2265203 | 9/1993 | | F16K/37/00 |
| GB | 2265204 | 9/1993 | | F16K/37/00 |
| GB | 2312731 | 11/1997 | | F16K/37/00 |
| WO | 89/05938 | 6/1989 | | F16K/37/00 |

* cited by examiner

Primary Examiner—A. Michael Chambers
(74) Attorney, Agent, or Firm—John M. Fernbacher

(57) ABSTRACT

Valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and an indicator tab attached to the valve base or the valve bonnet and extending outward from the valve body or valve bonnet in a direction generally parallel to the plane of rotation of the valve handle. The rotatable valve handle can be disposed in at least a first position and a second position, wherein the rotatable handle when disposed in the first position renders the indicator tab invisible when viewed in a direction generally perpendicular to the plane of rotation of the valve handle, and wherein the rotatable handle when disposed in the second position renders the indicator tab visible when viewed in a direction generally perpendicular to the plane of rotation of the valve handle.

18 Claims, 7 Drawing Sheets

MANIFOLD VALVE POSITION INDICATOR AND OPERATOR ALERTING SYSTEM

BACKGROUND OF THE INVENTION

Gas manifolds having multiple valves for directing different gases to various destinations are widely used in analytical instrumentation, specialty gas blending, microelectronic component manufacture, and selected process industries. In some applications, gas manifold systems are highly automated and are operated by sophisticated computer control systems. In other applications, because of cost, safety, and/or reliability considerations, some or all of the valves in a gas manifold system are designed for manual or hand operation. In the manual operation of these manifolds, an operator must set the position of a plurality of valves correctly so that various gases flow to the proper end user, analytical instrument, or apparatus. Processes using these hand-operated manifolds typically are batch processes requiring a number of cyclically repeated steps, each of which requires a different set of manifold valve positions. Because operator error in some of these systems can cause significant economic losses and may result in serious safety hazards, careful attention to valve positions during critical operating steps is extremely important.

Various types of valve position indicators for gas manifold valves are widely available and usually indicate whether a valve is open or closed. Many of these are integrated with electric or pneumatic drive mechanisms and display the valve position by means of electrical or mechanical readout mechanisms which are integral parts of the valves.

In certain applications in which an operator requires valve position information for manual manifold valves, it is desirable to have simple valve position indicators that are not electrically or mechanically driven. It is also desirable to have valve position indicators that can be easily installed on and removed from standard valves not originally designed or manufactured with position indicators. The present invention, which is described below and defined by the claims that follow, provides a simple valve position indicator that can be attached to standard valves to serve as visual operator reminders of required valve positions. The invention also includes the use of multiple valve position indicators installed on a manifold system to remind operators of a plurality of required valve settings, in both open and closed positions, for critical process steps in multiple-step manufacturing operations.

BRIEF SUMMARY OF THE INVENTION

The invention includes a detachable valve position indicator comprising an elongate tab having a first end and a second end, a first flexible member having a first and a second end, a second flexible member having a first and a second end, wherein the first end of the first flexible member and the first end of the second flexible member are attached to the first end of the elongate tab, a first connecting means attached to the second end of the first flexible member, and a second connecting means attached to the second end of the second flexible member. The first and second flexible members can be placed around a valve body, the first connecting means can be engaged with the second connecting means to attach the elongate tab to the valve body, and the first connecting means can be disengaged from the second connecting means to remove the elongate tab from the valve body.

The first and second flexible members may have a semi-circular shape and may be generally coplanar with the elongate tab. The first and second connecting means may comprise opposing ratchet-toothed connection members each having ratchet teeth of opposite pitch angles which can be engaged by sliding the connection members circumferentially about the valve body, thereby attaching the elongate tab to the valve body, and which can be disengaged by sliding the ratchet teeth apart in directions perpendicular to the plane formed by the first and second flexible members and the elongate tab, thereby removing the elongate tab from the valve body.

The elongate tab typically has a first surface and a second surface, and one of the surfaces may include an area having a different color than the color of the first and second flexible members and the color of the first and second connecting means. The detachable valve position indicator may be made of material selected from the group consisting of a polymeric material, a metallic material, and combinations thereof.

The invention also includes a valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and an indicator tab attached to the valve base or the valve bonnet and extending outward from the valve body or valve bonnet in a direction generally parallel to the plane of rotation of the valve handle. The rotatable valve handle can be disposed in at least a first position and a second position, wherein the rotatable handle when disposed in the first position may render the indicator tab invisible when viewed in a direction generally perpendicular to the plane of rotation of the valve handle, and wherein the rotatable handle when disposed in the second position may render the indicator tab visible when viewed in a direction generally perpendicular to the plane of rotation of the valve handle.

The rotatable valve handle when disposed in the first position may allow the flow of a fluid through the valve base and when disposed in the second position may prohibit the flow of a fluid through the valve base. Alternatively, the rotatable valve handle when disposed in the first position may prohibit the flow of a fluid through the valve base and when disposed in the second position may allow the flow of a fluid through the valve base. The valve assembly may be characterized by a valve type selected from the group consisting of a ball valve, a butterfly valve, and a diaphragm valve. The first position and the second position of the rotatable valve handle may define a one-quarter turn of the valve stem.

In another embodiment, the invention is a method for determining a desired position of a handle of a valve comprising (a) providing a valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and a moveable indicator tab attached to the valve base or the valve bonnet and extending outward from the valve body or valve bonnet in a direction generally parallel to the plane of rotation of the valve handle, wherein the rotatable valve handle can be disposed in at least a desired first position and an undesired second position;

(b) fixing the indicator tab in a circumferential position such that the rotatable handle when disposed in the desired first position renders the indicator tab invisible when viewed in a direction generally perpendicular to the plane of rotation of the valve handle, and such that the rotatable handle when disposed in the undesired second position renders the indicator tab visible when viewed in a direction generally perpendicular to the plane of rotation of the valve handle; and (c) viewing the valve assembly in a direction generally perpendicular to the plane of rotation of the valve handle to determine whether the indicator tab is visible or invisible, thereby determining whether the valve handle is in the desired first position or the undesired second position.

The first position of the rotatable handle may prohibit the flow of a fluid through the valve base and the undesired second position of the rotatable handle may allow the flow of a fluid through the valve base. Alternatively, the desired first position of the rotatable handle may allow the flow of a fluid through the valve base and the undesired second position of the rotatable handle may prohibit the flow of a fluid through the valve base.

The invention includes a fluid manifold system comprising (a) a plurality of valve assemblies, each valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and an indicator tab attached to the valve base or the valve bonnet and extending outward from the valve base or the valve bonnet in a direction generally parallel to the plane of rotation of the valve handle, wherein the rotatable valve handle can be disposed in at least a first position and a second position, wherein the rotatable handle when disposed in the first position renders the indicator tab invisible when viewed in a direction generally perpendicular to the plane of rotation of the valve handle, and wherein the rotatable handle when disposed in the second position renders the indicator tab visible when viewed in a direction generally perpendicular to the plane of rotation of the valve handle; and (b) manifold piping means which interconnect the valve assemblies such that flow of fluid through the valve assemblies and manifold can be controlled by setting the positions of the rotatable handles of the valve assemblies.

The positions of the rotatable handles on a portion of the valve assemblies may be located such that some of the indicator tabs are visible when viewed in a direction generally perpendicular to the plane of rotation of the valve handle. The positions of the rotatable handles on a portion of the valve assemblies may be located such that at least some of the indicator tabs are visible when viewed in a direction generally perpendicular to the plane of rotation of the valve handle. The positions of the rotatable handles on all of the valve assemblies may be set such that none of the indicator tabs are visible when viewed in a direction generally perpendicular to the plane of rotation of the valve handle.

The invention includes a method of operating a fluid manifold system comprising (a) providing a fluid manifold system which includes
(1) a plurality of valve assemblies, each valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and an indicator tab attached to the valve base or the valve bonnet and extending outward from the valve base or valve bonnet in a direction generally parallel to the plane of rotation of the valve handle, wherein the rotatable valve handle can be disposed in at least a first position and a second position, and (2) manifold piping means which interconnect the valve assemblies such that flow of fluid through the valve assemblies and manifold can be controlled by setting the positions of the rotatable handles on the valve assemblies;

(b) locating the indicator tab on each valve assembly such that the rotatable handle on each valve assembly when disposed in either the first position or in the second position renders the indicator tab invisible when viewed in a direction generally perpendicular to the plane of rotation of the valve handle;

(c) moving valve handles on the valve assemblies such that the indicator tabs on at least a portion of the valve assemblies are visible when viewed in a direction generally perpendicular to the plane of rotation of the valve handle; and (d) identifying the valve assemblies which have visible indicator tabs when viewed in a direction generally perpendicular to the plane of rotation of the valve handle and moving the valve handles on the valve assemblies so identified such that all indicator tabs on all valve assemblies are invisible when viewed in a direction generally perpendicular to the plane of rotation of the valve handle.

DETAILED DESCRIPTION OF THE INVENTION

The present invention relates to valve position indicators and the use of these valve position indicators to assist operators in setting the proper valve positions on fluid manifolds during critical process steps. The invention provides simple valve position indicators that can be attached to standard valves to serve as a visual operator reminder of required valve positions. The invention also includes the use of multiple valve position indicators installed on a manifold system to alert operators to a plurality of required valve settings, in both open and closed positions, for critical process steps in multiple-step manufacturing operations. Embodiments of the invention may be for directing the flow of gases or liquids.

Figure 1A:
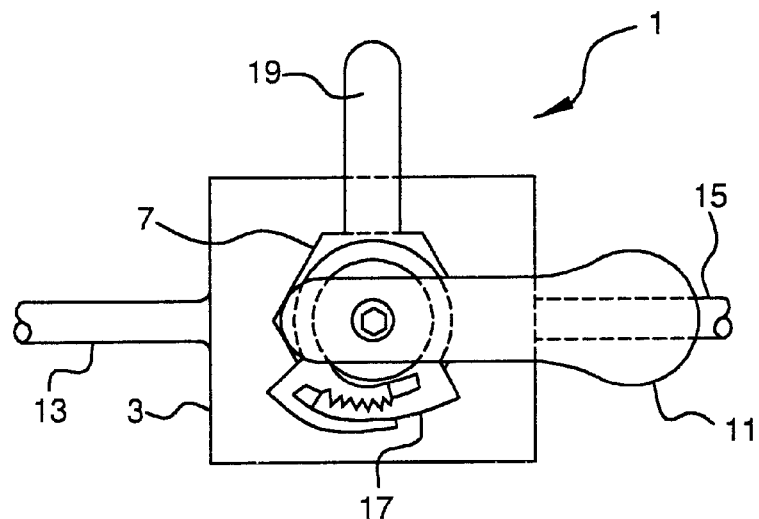
FIGS. 1A and 1B show views of a valve in an open position with an exemplary valve position indicator of the present invention.
Figure 1B:
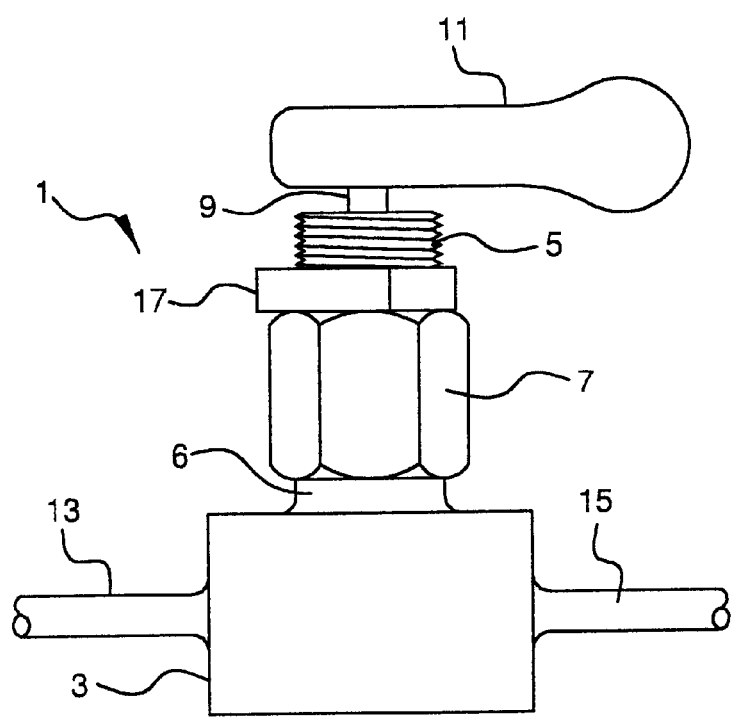

An exemplary valve assembly is illustrated in top and side views in FIGS. 1A and 1B respectively. Valve assembly 1 includes valve base 3, threaded bonnet section 5, bonnet base 6, bonnet or packing nut 7, valve stem 9, and handle 11. The exemplary valve as illustrated is a two-way, quarter-turn shutoff valve shown in the open position which allows fluid (gas or liquid) to flow from valve inlet 13 to valve outlet 15.

The valve is defined by the valve base 3, threaded bonnet section 5, bonnet base 6, bonnet or packing nut 7, valve stem 9, and handle 11. The valve body is defined by non-movable parts including valve base 3, threaded bonnet section 5, bonnet base 6, and bonnet or packing nut 7. The interior of valve base 3 includes inlet and outlet ports and a valve seat (not shown). The valve bonnet is defined by threaded bonnet section 5, bonnet base 6, and bonnet or packing nut 7.

Removable position indicator 17 fits tightly around threaded bonnet section 5 and has elongate tab or position indicator tab 19 that generally extends beyond the outer edge of valve base 3 and is visible in top view when valve handle 11 is in the open position. The top view is a view in a direction parallel to the axis of the valve stem and generally perpendicular to the plane of rotation of the valve handle. Position indicator tab 19 is generally parallel to the plane of rotation of handle 11.

Figure 2A:
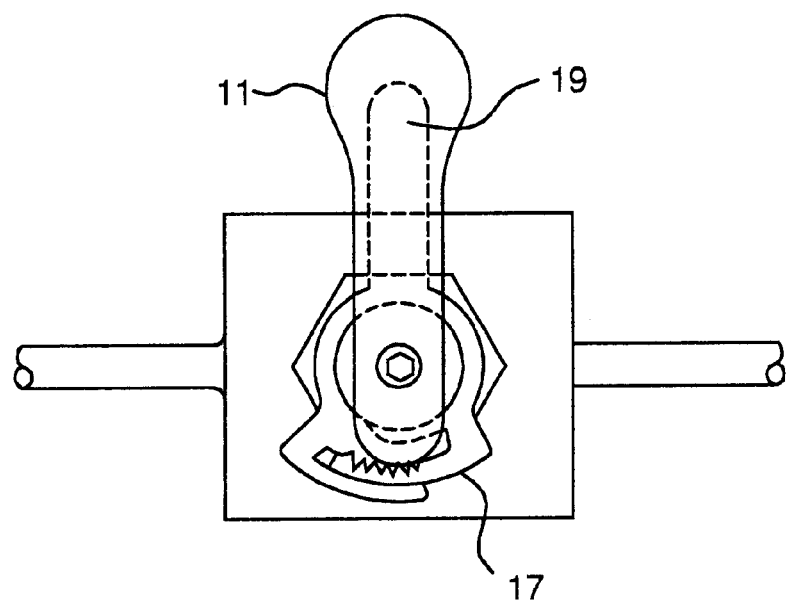
FIGS. 2A and 2B show views of the valve in FIGS. 1A and 1B in a closed position.
Figure 2B:
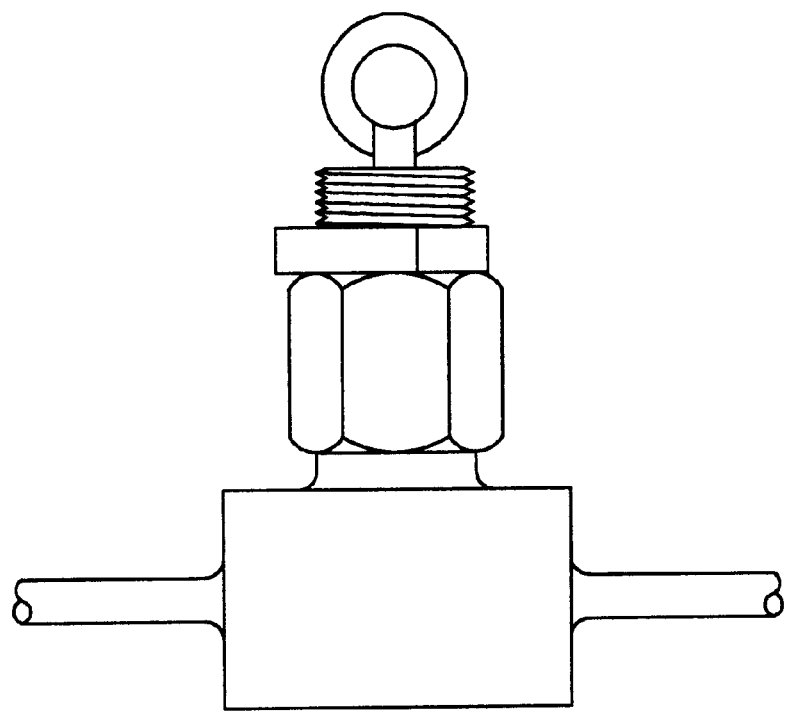

FIGS. 2A and 2B shows the valve and position indicator of FIGS. 1A and 1B when the valve is in the closed position. It is seen that handle 11 covers elongate tab or indicator tab 19 of removable position indicator 17 such that indicator tab 19 is not visible when viewed in a direction generally parallel to the axis of the valve stem or generally perpendicular to the plane of rotation of the valve handle.

Position indicator 17 is installed on the valve so that indicator tab 19 indicates a preferred handle position and gives a person operating the valve a quick visual check on the preferred position of the valve handle. If the operator can see indicator tab 19, valve handle 11 is not in the preferred position. In FIGS. 1A, 1B, 2A, and 2B, the preferred position of the handle is the off position wherein no fluid can flow through the valve. As explained later, the preferred position is defined by critical process steps in which the valve must be in the correct position to eliminate costly process errors or potential hazards to personnel at a downstream location. Some or all of the upper surface of indicator tab 19 may be coated with a bright color, such as fluorescent orange, to assist an operator in a quick visual check of the valve handle position. If the operator sees the tab when a critical process step is about to begin, it becomes a quick reminder to move the valve handle to the closed or off position. During non-critical process steps, the valve may be in the correct position when open, and in this case the tab would be visible.

FIGS. 1A, 1B, 2A, and 2B show the preferred valve position as the closed position. Alternatively, the preferred valve position may be the open position. In this alternative, position indicator 17 is installed on the valve so that indicator tab 19 is parallel (not shown) to outlet line 15 and is not visible when the valve is open. If the operator sees the tab when a critical process step is about to begin, it becomes a quick reminder to open the valve. During non-critical process steps, the valve may be in the correct position when closed.

Position indicator 17 may be readily installed or removed as needed and is not necessarily a permanent part of the valve. It may be installed on any fixed part of the valve, such as the threaded bonnet section 5 as illustrated in FIGS. 1A, 1B, 2A, and 2B. Alternatively, it could be installed on bonnet base 6, bonnet nut 7, or even on valve base 3. It is generally preferred that the position indicator be installed as close as possible to handle 11 while allowing an appropriate gap for an operator to turn the handle without contacting indicator tab 19. As described later, it is desirable that the installation of the position indicator be simple and require standard tools.

The position indicator may be installed on any type of valve which is operated with a rotary handle in one of at least two fixed positions. The valve illustrated in FIGS. 1A, 1B, 2A, and 2B, for example, is an on/off quarter turn valve and can be any type of commercially available valve. Valves used in this service may include ball, butterfly, or diaphragm type valves.

Use of the position indicator is not limited to the two-way on/off valve described above and may be used to indicate a preferred handle position for any type of flow diversion or shutoff valve which uses multiple handle positions. For example, three-way port valves are available having three inlet/outlet ports in which one handle position allows flow between a first port and a second port while blocking a third port, another handle position directs flow between the second port and the third port while blocking the first port, and another handle position which blocks all three ports. In this example, any one of the three handle positions could be the preferred handle position designated by a position indicator of the type disclosed herein.

Figure 3:
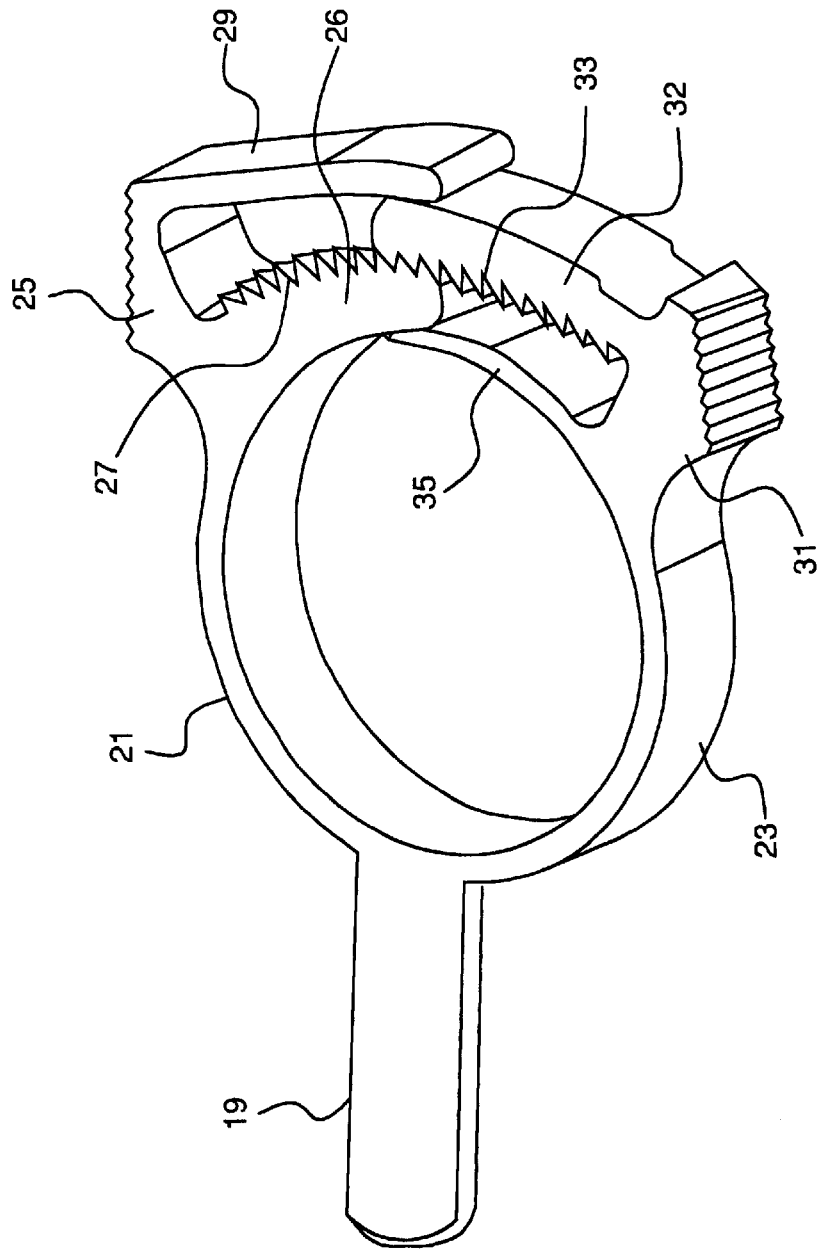
FIG. 3 is an exemplary removable valve position indicator of the present invention.

An exemplary type of position indicator as used in FIGS. 1A, 1B, 2A, and 2B is illustrated by the position indicator tab assembly of FIG. 3. Elongate tab or indicator tab 19 is connected to first flexible member 21 and second flexible member 23. First flexible member 21 in turn is connected to ratchet-toothed connection member 25 having ratchet member 26 with ratchet teeth 27 and flexible spring member 29. Second flexible member 23 is connected to ratchet-toothed connection member 31 having ratchet member 32 and ratchet teeth 33 and flexible spring member 35.

Spring members 29 and 35 press ratchet teeth 27 and 33 together in a radial direction while the ratchet teeth are engaged by pressing and moving ratchet-toothed connection members 25 and 31 together in a circumferential direction. The ratchet teeth 27 and 33 have opposite pitch angles and lock together as ratchet-toothed connection members 25 and 31 are moved together circumferentially. Flexible members 21 and 23 along with flexible spring member 35 firmly grasp the valve bonnet as illustrated in FIGS. 1A, 1B, 2A, and 2B. The engaged ratchet teeth can be readily disengaged by pulling ratchet member 26 in an upward axial direction while bending flexible member 21 and pushing ratchet member 32 in a downward axial direction while bending flexible member 23. The position indicator can be reused as desired.

The actual dimensions of the various parts of the position indicator of FIG. 3 may be varied and are determined by the dimensions of the valve upon which the position indicator is installed. The position indicator parts may be fabricated of any appropriate material and preferably are made of flexible material, particularly flexible members 21 and 23. The entire position indicator may be fabricated from a polymeric material, such as, for example, nylon, polypropylene, or high density polyethylene. Alternatively, metal of the appropriate flexibility may be used, and combinations of polymeric material and metal may be used if desired.

While the ratchet mechanism illustrated in FIG. 3 is a simple and preferred connecting means for connecting the ends of flexible members 21 and 23, any other connecting means may be used. For example, snap mechanisms, worm clamps, screw clamps, lever-type locking mechanisms, or mating pieces of Velcro® could be attached to the ends of flexible members 21 and 23 and engaged to install the position indicator on a valve.

Alternatives to the use of the position indicator tab assembly of FIG. 3 are possible for attaching an indicator tab to a valve. For example, an indicator tab could be attached to a closed ring sized to fit over threaded bonnet 5 (FIG. 1B) wherein the ring has a set screw to fix the position of the ring on the bonnet. Alternatively, the closed ring could be hexagonally-shaped and sized to fit over bonnet nut 7 (FIG. 1B) wherein the ring has a set screw to fix the position of the ring on the bonnet nut. Installation of these alternative assemblies would require removing and reinstalling valve handle 11.

In the above embodiments, the various types of position indicator tab assemblies are designed to be attachable to and detachable from standard valves which are not equipped with any position indicators. If desired, however, a moveable indicator tab could be designed as an integral part of a valve such that the position of the indicator tab could be changed as required. This tab would be used in the same manner as the removable indicator tabs described above.

Figure 4:
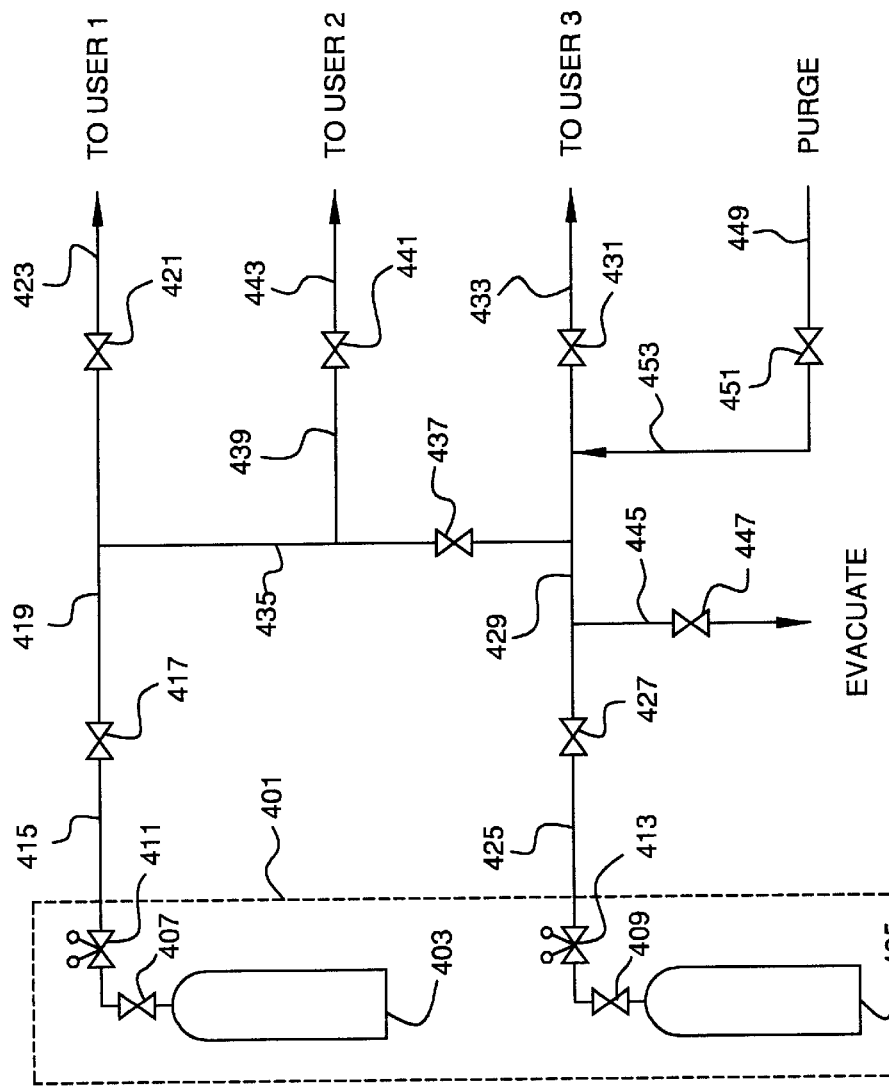
FIG. 4 is a schematic flow diagram of an exemplary gas manifold system.

The use of the valve position indicators is illustrated with reference to the schematic flow diagram of a gas cabinet and manifold shown in FIG. 4. In this example, gas cabinet 401 encloses gas cylinders 403 and 405 equipped with shutoff valves 407 and 409, respectively, and with pressure regulators 411 and 413, respectively. The manifold system includes line 415, valve assembly 417, line 419, valve assembly 421, and line 423 through which contents of cylinder 403 can be delivered to user 1. The manifold system also includes line 425, valve assembly 427, line 429, valve assembly 431, and line 433 through which contents of cylinder 405 can be delivered to user 3. Lines 419 and 429 are connected by crossover line 435 with valve assembly 437. Line 439, valve assembly 441, and line 443 deliver gas to user 2. The manifold system can be evacuated via line 445 and valve assembly 447. Purge gas can be introduced into the manifold system via line 449, valve assembly 451, and line 453. Valve assemblies 417, 421, 427, 431, 437, 441, 447, and 451 are two-way quarter-turn valves fitted with position indicators as described above with reference to FIGS. 1A, 1B, 2A, and 2B.

The manifold system in this example may be operated in three modes. In a first mode, the manifold is evacuated via line 445 and open valve assembly 447. In this first mode, valve assembly 437 is open and valve assemblies 417, 421, 427, 431, and 457 are closed. In a second mode, the manifold and lines 423, 433, and 443 to downstream users 1, 2, and 3 are purged with purge gas supplied via line 449, valve assembly 451, and line 453. In this second mode, valve assemblies 421, 431, 437, 441, and 451 are open while valve assemblies 417, 427, and 447 are closed. In a third mode, gas from cylinder 403 is delivered to users 1 and 2 while gas from cylinder 405 is delivered to user 3. In this third mode, valve assemblies 417, 421, 427, 431, and 441 are open while valve assemblies 437, 447, and 451 are closed.

The first and second modes of operation may be described as non-critical operating modes wherein an operator error in placing the valves in the prescribed open and closed positions will not cause serious process or safety problems for downstream users 1, 2, and 3. The third mode of operation may be described as a critical operating mode wherein an operator error in placing the valves in the prescribed open and closed positions will cause serious process or safety problems for downstream users 1, 2, and 3. Thus the positions of the valves in the third mode of operation are critical and the valve position indicators are located on the valves such that the operator can tell immediately by a visual check whether any of the valves are in the wrong position.

Figure 5:
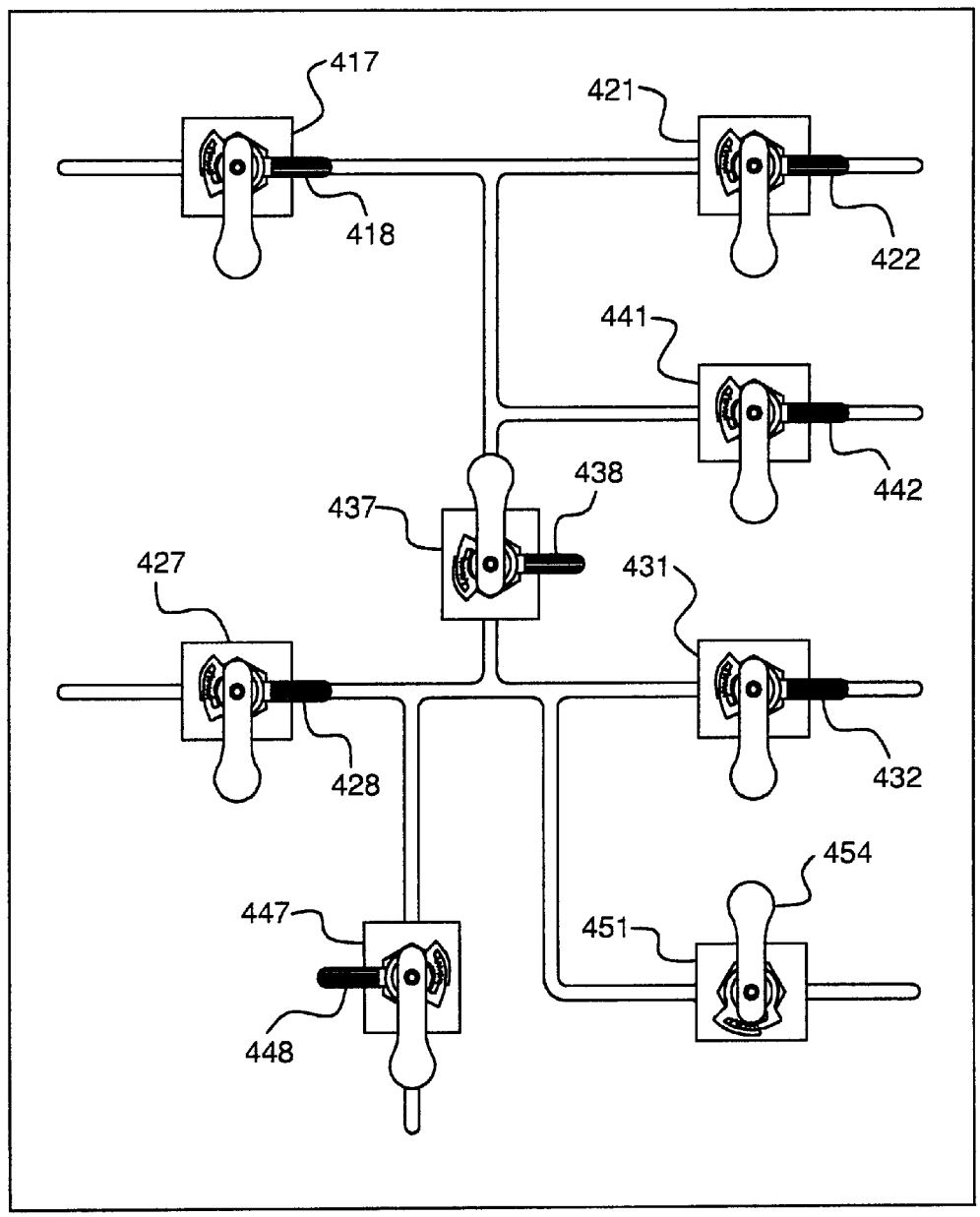
FIG. 5 is a schematic view of a gas manifold control panel showing valves in various positions for an exemplary process step using valve position indicators of the present invention.

A schematic sketch of the manifold, valves, and valve position indicators for the first non-critical mode of operation is shown in FIG. 5. This manifold is mounted vertically or near vertically such that the operator views the manifold as it appears in FIG. 5, that is, from the front. The operator's view of each valve assembly is in a direction generally parallel to the axis of the valve stem and generally perpendicular to the plane of rotation of the valve handle. The term "generally perpendicular to the plane of rotation of the valve handle" means that the operator may view any given valve and valve position indicator in a direction perpendicular to the plane of rotation of the valve handle or at an angle of less than about 45 degrees from a direction perpendicular to the plane of rotation of the valve handle. The location of the valves and lines in FIG. 5 correspond to those of FIG. 4. It is seen that valve assemblies 437 and 447 are open while the other valves are closed, and that valve position indicator tabs 418, 422, 428, 432, 438, 442, and 448 are visible. The valve position indicator tab on valve assembly 451 is hidden by handle 454 and therefore is not visible to the operator. Since this mode of operation is non-critical, the operator will not be concerned that many of the valve position indicator tabs are visible.

Figure 6:
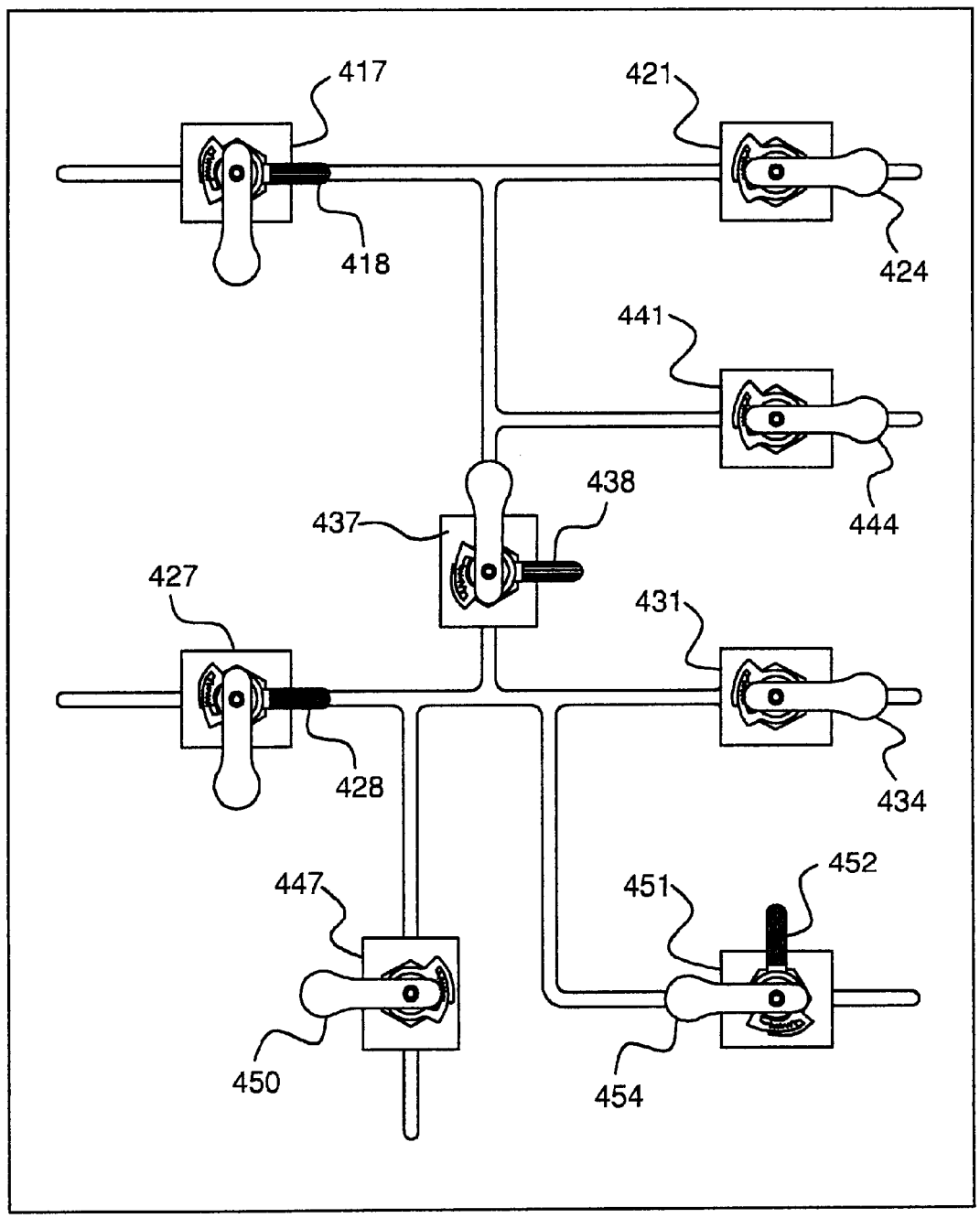
FIG. 6 is a schematic view of the gas manifold control panel showing valves in various positions for an alternative exemplary process step using valve position indicators of the present invention.

A schematic sketch of the manifold, valves, and valve position indicators for the second non-critical mode of operation is shown in FIG. 6. As in FIG. 5, the manifold is mounted vertically and the location of the valve assemblies and lines correspond to those of FIG. 5; the operator views the manifold as it is seen in FIG. 6. It is seen that valve assemblies 421, 431, 437, 441, and 451 are open while the other valves are closed. Valve position indicator tabs 418, 428, 438, and 452 are visible in this mode of operation. The valve position indicator tabs on valve assemblies 421, 431, 441, and 447 are hidden by handles 424, 434, 444, and 450, respectively, and therefore are not visible to the operator. Since this mode of operation is non-critical, the operator will not be concerned that many of the valve position indicator tabs are visible.

Figure 7:
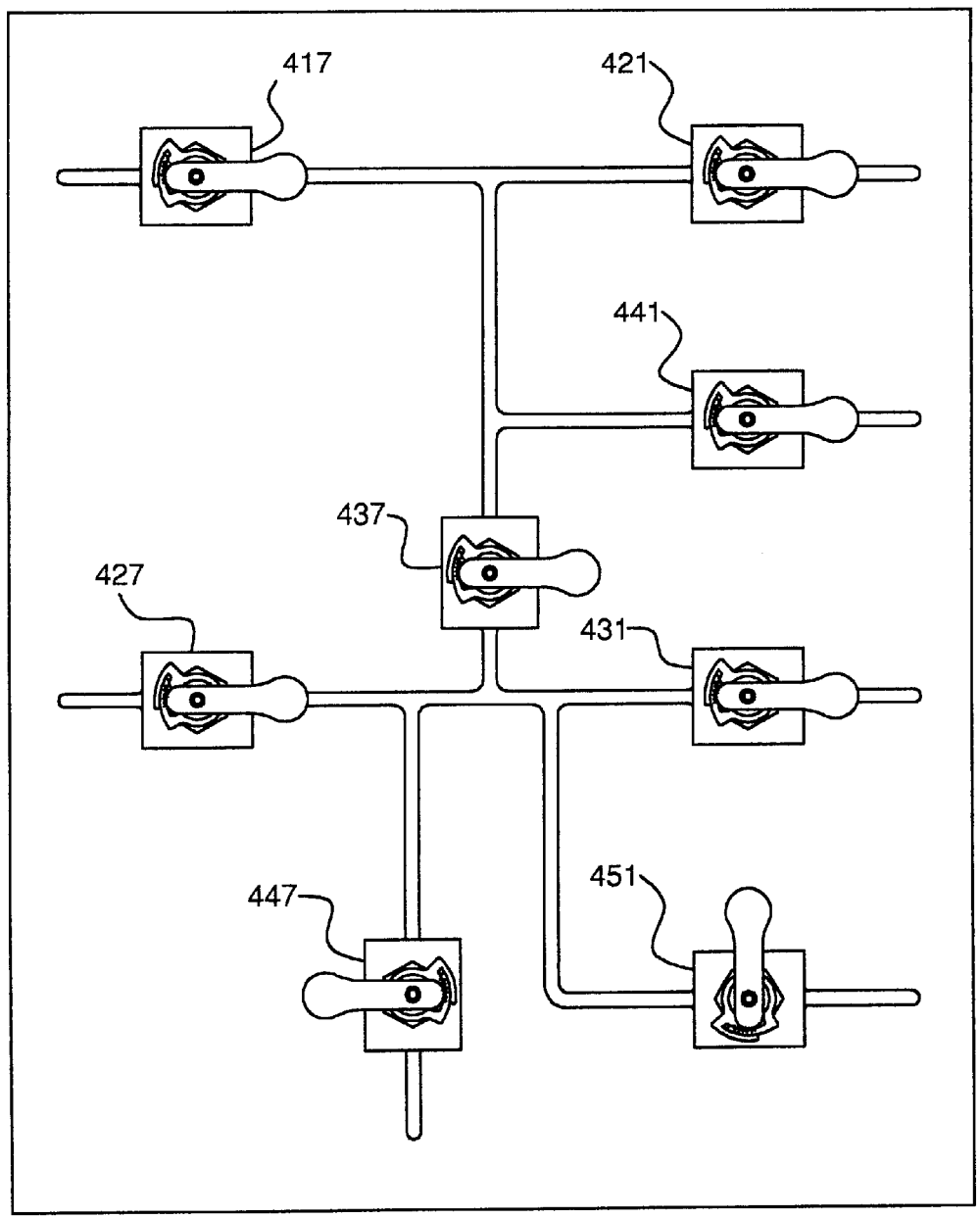
FIG. 7 is a schematic view of the gas manifold control panel showing valves in various positions for another alternative exemplary process step using valve position indicators of the present invention.

A schematic sketch of the manifold, valves, and valve position indicators for the critical mode of operation is shown in FIG. 7. As in FIG. 6, the manifold is mounted vertically and the location of the valve assemblies and lines correspond to those of FIG. 6; the operator views the manifold as seen in FIG. 7. It is seen that valve assemblies 417, 421, 427, 431, and 441 are open while the other valves are closed. No valve position indicator tabs are visible to the operator in this mode of operation because the valve position indicator tabs on all valves are hidden by the respective valve handles. Since this mode of operation is critical, the operator will be concerned if any of the valve position indicator tabs are visible. A quick visual check will remind the operator immediately if any of the valve handles are in the wrong positions. This visual check does not require the operator to consider whether specific valves are open or closed, but simply to consider if any valve handle is in the wrong position and should be moved to the correct position.

The method of the present invention is a valuable tool and guide for an operator of a group of fluid manifolds, each of which utilizes multiple manually-operated valves and proceeds through multiple process steps with multiple valve positions. The invention provides a simple, quick, visual guide for the operator to ensure that all valves are in the proper positions (e.g., open or closed) for critical process steps. The method is especially useful for operators who are responsible for a large number of manifold systems in a manufacturing environment where errors in valve settings could cause economic damage to products or equipment, or hazards to persons associated with these products or equipment. The method is applicable, for example, in a semiconductor fabrication facility in which a large number of multi-valve gas manifolds with manually-operated valves are utilized to supply hazardous reactant gases to numerous process tools.

What is claimed is:

1. A method for determining a desired position of a handle of a valve comprising
   (a) providing a valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and a moveable indicator tab attached to the valve base or the valve bonnet and extending outward from the valve body or valve bonnet in a direction generally parallel to the plane of rotation of the valve handle, wherein the rotatable valve handle can be disposed in at least a desired first position and an undesired second position;
   (b) fixing the indicator tab in a circumferential position such that the rotatable handle when disposed in the desired first position renders the indicator tab invisible when viewed in a direction generally perpendicular to the plane of rotation of the valve handle, and such that the rotatable handle when disposed in the undesired second position renders the indicator tab visible when viewed in a direction generally perpendicular to the plane of rotation of the valve handle; and
   (c) viewing the valve assembly in a direction generally perpendicular to the plane of rotation of the valve handle to determine whether the indicator tab is visible or invisible, thereby determining whether the valve handle is in the desired first position or the undesired second position.

2. The method of claim 1 wherein the desired first position of the rotatable handle prohibits the flow of a fluid through the valve base and the undesired second position of the rotatable handle allows the flow of a fluid through the valve base.

3. The method of claim 1 wherein the desired first position of the rotatable handle allows the flow of a fluid through the valve base and the undesired second position of the rotatable handle prohibits the flow of a fluid through the valve base.

4. A method of operating a fluid manifold system comprising
   (a) providing a fluid manifold system which includes
      (1) a plurality of valve assemblies, each valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and an indicator tab attached to the valve base or the valve bonnet and extending outward from the valve base or valve bonnet in a direction generally parallel to the plane of rotation of the valve handle, wherein the rotatable valve handle can be disposed in at least a first position and a second position, and
      (2) manifold piping means which interconnect the valve assemblies such that flow of fluid through the valve assemblies and manifold can be controlled by setting the positions of the rotatable handles on the valve assemblies;
   (b) locating the indicator tab on each valve assembly such that the rotatable handle on each valve assembly when disposed in either the first position or in the second position renders the indicator tab invisible when viewed in a direction generally perpendicular to the plane of rotation of the valve handle;
   (c) moving valve handles on the valve assemblies such that the indicator tabs on at least a portion of the valve assemblies are visible when viewed in a direction generally perpendicular to the plane of rotation of the valve handle; and
   (d) identifying the valve assemblies which have visible indicator tabs when viewed in a direction generally perpendicular to the plane of rotation of the valve handle and moving the valve handles on the valve assemblies so identified such that all indicator tabs on all valve assemblies are invisible when viewed in a direction generally perpendicular to the plane of rotation of the valve handle.

5. A detachable valve position indicator comprising an elongate tab having a first end and a second end, a first flexible member having a first and a second end, a second flexible member having a first and a second end, wherein the first end of the first flexible member and the first end of the second flexible member are attached to the first end of the elongate tab, a first connecting means attached to the second end of the first flexible member, and a second connecting means attached to the second end of the second flexible member, wherein the first and second flexible members can be placed around a valve body, the first connecting means can be engaged with the second connecting means to attach the elongate tab to the valve body, and the first connecting means can be disengaged from the second connecting means to remove the elongate tab from the valve body.

6. The detachable valve position indicator of claim 5 wherein the first and second flexible members have a semicircular shape and are generally coplanar with the elongate tab.

7. The detachable valve position indicator of claim 6 wherein the first and second connecting means comprise opposing ratchet-toothed connection members each having ratchet teeth of opposite pitch angles which can be engaged by sliding the connection members circumferentially about the valve body, thereby attaching the elongate tab to the valve body, and which can be disengaged by sliding the ratchet teeth apart in directions perpendicular to the plane formed by the first and second flexible members and the elongate tab, thereby removing the elongate tab from the valve body.

8. The detachable valve position indicator of claim 5 wherein the elongate tab has a first surface and a second surface, and wherein one of the surfaces includes an area having a different color than the color of the first and second flexible members and the color of the first and second connecting means.

9. The detachable valve position indicator of claim 5 which is made of material selected from the group consisting of a polymeric material, a metallic material, and combinations thereof.

10. A valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and an indicator tab attached to the valve base or the valve bonnet and extending outward from the valve body or valve bonnet in a direction generally parallel to the plane of rotation of the valve handle, wherein the rotatable valve handle can be disposed in at least a first position and a second position, wherein the rotatable handle when disposed in the first position renders the indicator tab invisible when viewed in a direction generally perpendicular to the plane of rotation of the valve handle, and wherein the rotatable handle when disposed in the second position renders the indicator tab visible when viewed in a direction generally perpendicular to the plane of rotation of the valve handle.

11. The valve assembly of claim 10 wherein the rotatable valve handle when disposed in the first position allows the flow of a fluid through the valve base and when disposed in the second position prohibits the flow of a fluid through the valve base.

12. The valve assembly of claim 10 wherein the rotatable valve handle when disposed in the first position prohibits the flow of a fluid through the valve base and when disposed in the second position allows the flow of a fluid through the valve base.

13. The valve assembly of claim 10 which is characterized by a valve type selected from the group consisting of a ball valve, a butterfly valve, and a diaphragm valve.

14. The valve assembly of claim 13 wherein the first position and the second position of the rotatable valve handle define a one-quarter turn of the valve stem.

15. A fluid manifold system comprising
(a) a plurality of valve assemblies, each valve assembly comprising a valve base, a valve bonnet attached thereto, a rotatable valve stem extending coaxially through the valve bonnet, a rotatable valve handle attached to the valve stem and having a plane of rotation which is generally perpendicular to the axis of the valve stem, and an indicator tab attached to the valve base or the valve bonnet and extending outward from the valve base or the valve bonnet in a direction generally parallel to the plane of rotation of the valve handle, wherein the rotatable valve handle can be disposed in at least a first position and a second position, wherein the rotatable handle when disposed in the first position renders the indicator tab invisible when viewed in a direction generally perpendicular to the plane of rotation of the valve handle, and wherein the rotatable handle when disposed in the second position renders the indicator tab visible when viewed in a direction generally perpendicular to the plane of rotation of the valve handle; and
(b) manifold piping means which interconnect the valve assemblies such that flow of fluid through the valve assemblies and manifold can be controlled by setting the positions of the rotatable handles of the valve assemblies.

16. The fluid manifold system of claim 15 wherein the positions of the rotatable handles on a portion of the valve assemblies are located such that some of the indicator tabs are visible when viewed in a direction generally perpendicular to the plane of rotation of the valve handle.

17. The fluid manifold system of claim 15 wherein the positions of the rotatable handles on a portion of the valve assemblies are located such that at least some of the indicator tabs are visible when viewed in a direction generally perpendicular to the plane of rotation of the valve handle.

18. The fluid manifold system of claim 15 wherein the positions of the rotatable handles on all of the valve assemblies are set such that none of the indicator tabs are visible when viewed in a direction generally perpendicular to the plane of rotation of the valve handle.

* * * * *